US009481932B2

(12) United States Patent
Law

(10) Patent No.: US 9,481,932 B2
(45) Date of Patent: Nov. 1, 2016

(54) METHOD AND APPARATUS FOR PROGRESSIVELY FORGING A HARD DISK DRIVE BASE PLATE

(75) Inventor: Kung Ying Law, Singapore (SG)

(73) Assignee: Cheung Woh Technologies Ltd., Singapore (SG)

(*) Notice: Subject to any disclaimer, the term of this patent is extended or adjusted under 35 U.S.C. 154(b) by 894 days.

(21) Appl. No.: 13/457,304

(22) Filed: Apr. 26, 2012

(65) Prior Publication Data
US 2013/0283877 A1    Oct. 31, 2013

(51) Int. Cl.
C23C 18/32 (2006.01)
B21K 23/00 (2006.01)
B21C 23/06 (2006.01)
G11B 25/04 (2006.01)

(52) U.S. Cl.
CPC ............ C23C 18/32 (2013.01); B21C 23/06 (2013.01); B21K 23/00 (2013.01); G11B 25/043 (2013.01)

(58) Field of Classification Search
CPC .... H01R 43/042; B21D 35/00; B21D 43/05; B21D 27/04; B21D 51/2615; B21D 51/2638; B21D 43/18; B21D 5/02; B21D 19/08; B21D 53/00; B30B 15/04; B21B 39/00; B21J 5/02; B21J 13/08; B21J 9/02; B21J 9/022; B21J 5/00; B21K 1/30; B21K 27/04; C21D 8/0226; C21D 2261/00; C23C 18/32; C23C 18/34; C23C 18/36
USPC ......... 72/404, 405.01, 352, 356, 361, 379.2; 29/557; 148/649, 653; 427/438
See application file for complete search history.

(56) References Cited

U.S. PATENT DOCUMENTS

| 3,638,471 A | * | 2/1972 | Martin ........................... 72/377 |
| 3,860,803 A | | 1/1975 | Levine |
| 4,023,313 A | | 5/1977 | LeBlanc |
| 4,106,422 A | | 8/1978 | Buhrke |
| 4,651,773 A | | 3/1987 | Takahashi et al. |
| 4,785,523 A | | 11/1988 | Koseki et al. |
| 4,821,403 A | | 4/1989 | Rolland et al. |

(Continued)

FOREIGN PATENT DOCUMENTS

EP    1724996 A2    11/2006
JP    58077720 A    5/1983

(Continued)

OTHER PUBLICATIONS

Aida Brochure, LFL New Leveler Feeder 300-E/300R, "Providing Easier Small and Midsize Coil Handling," p. 1 picture with description, p. 2 LFL main specifications and options, extracted from JIS Handbook, prior to Aug. 16, 2000, 2 pages.

(Continued)

Primary Examiner — David Bryant
Assistant Examiner — Lawrence Averick
(74) Attorney, Agent, or Firm — Blakely, Sokoloff, Taylor & Zafman LLP

(57) ABSTRACT

A method and apparatus for forming a hard disk drive base plate with a sequence of progressive forging operations is described. The method may include advancing an initial hard disk drive base plate cut from an extruded sheet through a plurality of stations of a transfer die assembly. The method may also include performing a sequence of forgings on the initial hard disk drive base plate to progressively form parts on a hard disk drive base plate.

21 Claims, 13 Drawing Sheets

(56) References Cited

U.S. PATENT DOCUMENTS

| | | |
|---|---|---|
| 5,034,837 A | 7/1991 | Schmitz |
| 5,047,604 A | 9/1991 | Grass et al. |
| 5,313,124 A | 5/1994 | Macpherson |
| 5,347,888 A | 9/1994 | Yoshino et al. |
| 5,417,097 A | 5/1995 | Kojima et al. |
| 5,584,202 A | 12/1996 | Kanamaru et al. |
| 5,587,856 A | 12/1996 | Aoyama |
| 5,602,700 A | 2/1997 | Viskochil et al. |
| 5,624,319 A | 4/1997 | Golczyk et al. |
| 5,765,275 A * | 6/1998 | Obara ................. 29/603.03 |
| 5,906,083 A | 5/1999 | Olsen et al. |
| 5,941,113 A | 8/1999 | Kanemitsu et al. |
| 5,966,976 A | 10/1999 | Haraga |
| 6,018,977 A | 2/2000 | Kanno et al. |
| 6,023,392 A | 2/2000 | Kim |
| 6,063,508 A | 5/2000 | Hanrahan et al. |
| 6,075,695 A | 6/2000 | Konno et al. |
| 6,084,750 A | 7/2000 | Shimazu et al. |
| 6,178,061 B1 | 1/2001 | Obara |
| 6,191,921 B1 * | 2/2001 | Hanrahan ............ C21D 8/0447 360/135 |
| 6,227,029 B1 | 5/2001 | Stanley |
| 6,250,127 B1 * | 6/2001 | Polese et al. ................. 72/256 |
| 6,275,353 B1 | 8/2001 | Briggs |
| 6,307,713 B1 | 10/2001 | Miyata et al. |
| 6,327,151 B1 | 12/2001 | Chen et al. |
| 6,337,782 B1 | 1/2002 | Guerin et al. |
| 6,382,064 B1 | 5/2002 | Dugger |
| 6,389,869 B1 | 5/2002 | Wakita et al. |
| 6,397,651 B2 | 6/2002 | Usui |
| 6,402,009 B1 | 6/2002 | Ishikawa |
| 6,411,581 B1 | 6/2002 | Saitou et al. |
| 6,426,847 B1 | 7/2002 | Dague et al. |
| 6,427,317 B1 | 8/2002 | Choi |
| 6,430,799 B1 | 8/2002 | Ballard et al. |
| 6,542,459 B2 | 4/2003 | Miyazaki et al. |
| 6,608,732 B2 | 8/2003 | Bernett et al. |
| 6,678,574 B2 * | 1/2004 | Fujii et al. ................. 700/145 |
| 6,982,850 B1 * | 1/2006 | Ying ................. 360/97.16 |
| 7,146,713 B1 * | 12/2006 | Ying ................. 29/603.16 |
| 7,546,669 B1 * | 6/2009 | Ying ................. 29/430 |
| 7,628,129 B2 * | 12/2009 | Takeshima et al. ....... 123/90.6 |
| 7,849,578 B2 * | 12/2010 | Ying ................. B21D 35/00 29/430 |
| 2002/0054806 A1 * | 5/2002 | Sakamura et al. ............ 411/180 |
| 2003/0076306 A1 | 4/2003 | Zadesky et al. |
| 2003/0095096 A1 | 5/2003 | Robbin et al. |
| 2007/0000114 A1 * | 1/2007 | Franco et al. ................. 29/426.4 |
| 2007/0245799 A1 * | 10/2007 | Asakawa ................. 72/467 |
| 2007/0277579 A1 * | 12/2007 | Ruste ................. 72/355.6 |
| 2009/0133462 A1 * | 5/2009 | Cairo et al. ................. 72/374 |
| 2009/0235517 A1 * | 9/2009 | Ying ................. B21D 35/00 29/603.03 |

FOREIGN PATENT DOCUMENTS

| | | |
|---|---|---|
| JP | 63036932 A | 2/1988 |
| JP | 5-094668 A | 4/1993 |
| JP | 05123755 A | 5/1993 |
| JP | 8-153386 A | 6/1996 |
| JP | 9-120669 A | 5/1997 |
| WO | WO 03/088176 A1 | 10/2003 |
| WO | WO 2006/009516 A1 | 1/2006 |

OTHER PUBLICATIONS

Aida Press Handbook (Third Edition) by Aida Engineering, Ltd, 1992, Pertinent Pages: Cover, Forward, and Contents of Referenced Handbook (13 pages).

Aluminum Extrusion Industries (AEI) Brochure, "Quality That Always Shines Through," Prior to Aug. 16, 2000, 3 pages.

JIS Handbook 1986: "Non-Ferrous Metals and Metallurgy," by Japanese Standards Association, Pertinent Pages: Cover; Foreword; p. 4 showing example, p. 9 index, and pp. 605, 608, 611, 613, 617, and 639-641, 13 pages.

The E Coating Process Overview, Jan. 2, 1998, 4 pages.

* cited by examiner

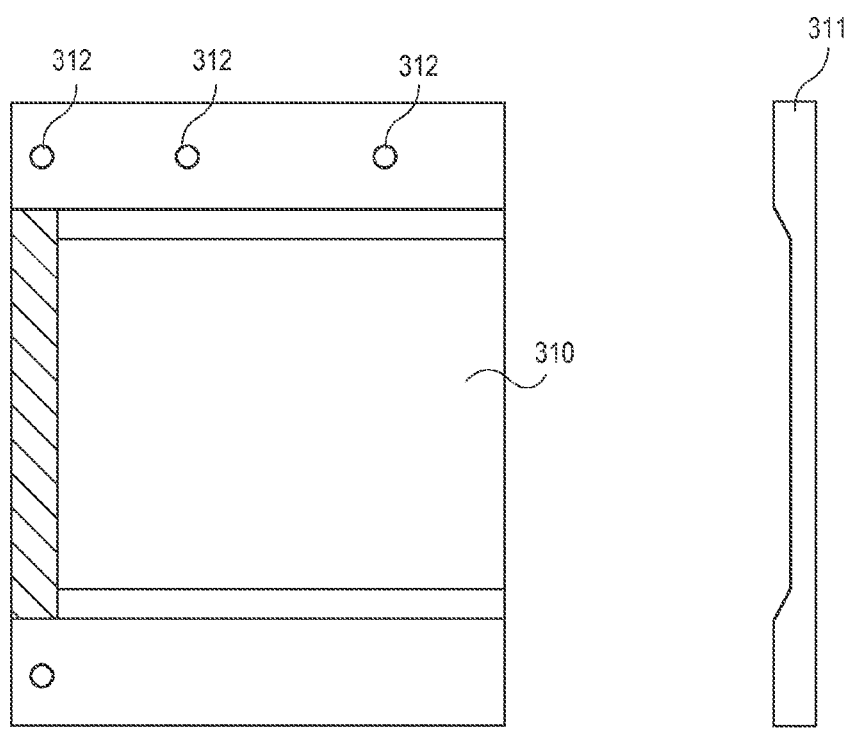

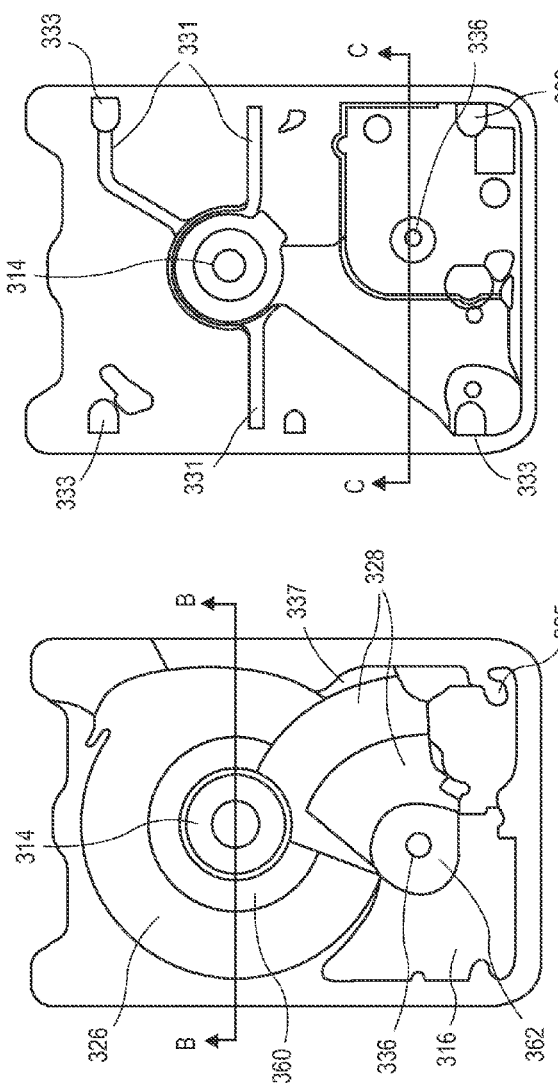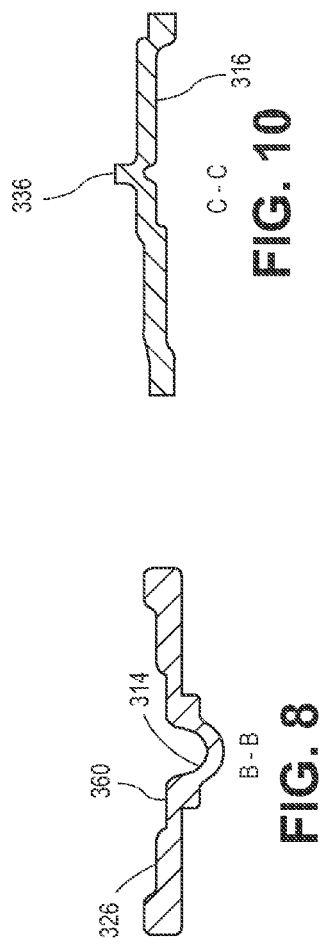

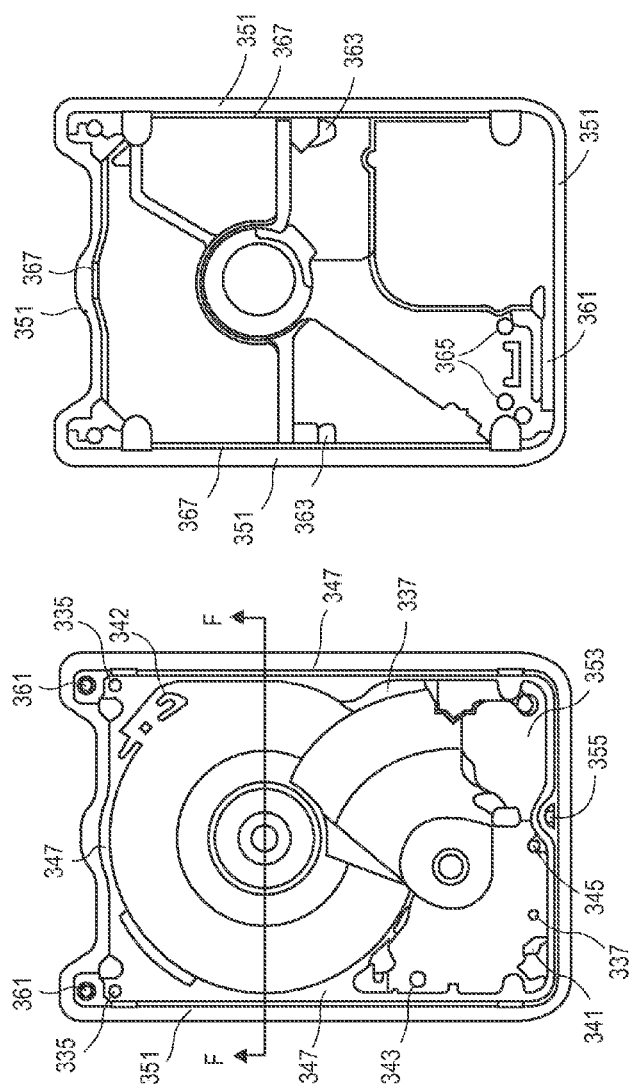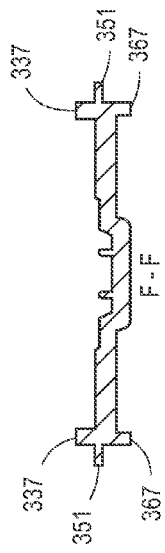

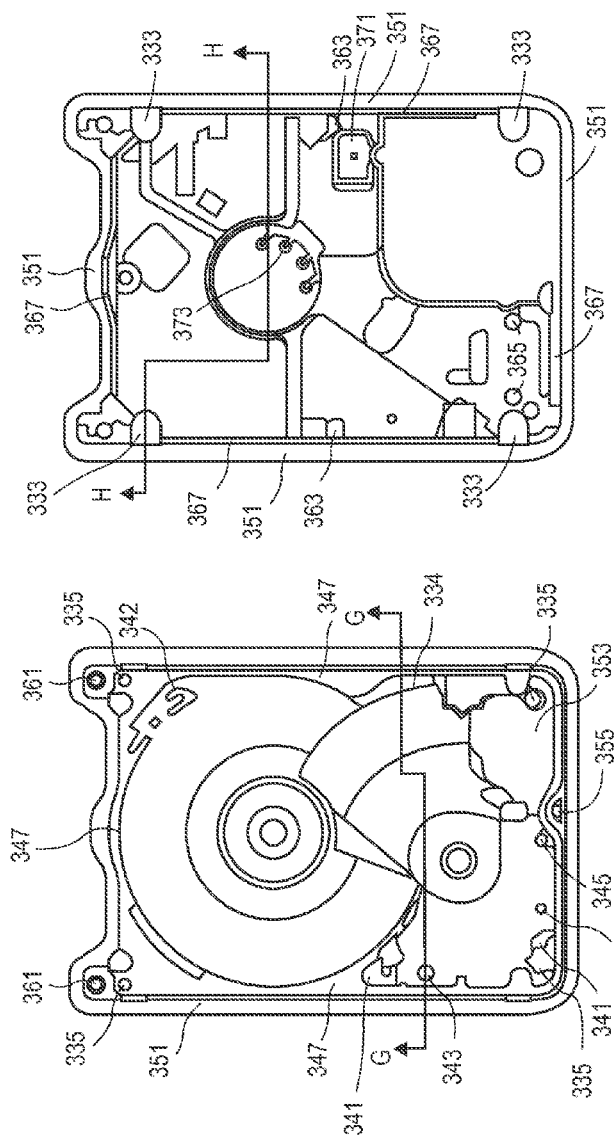
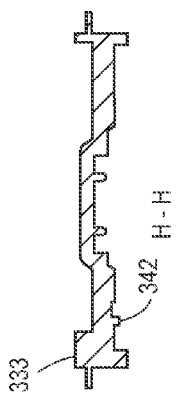
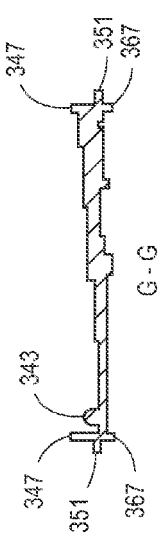

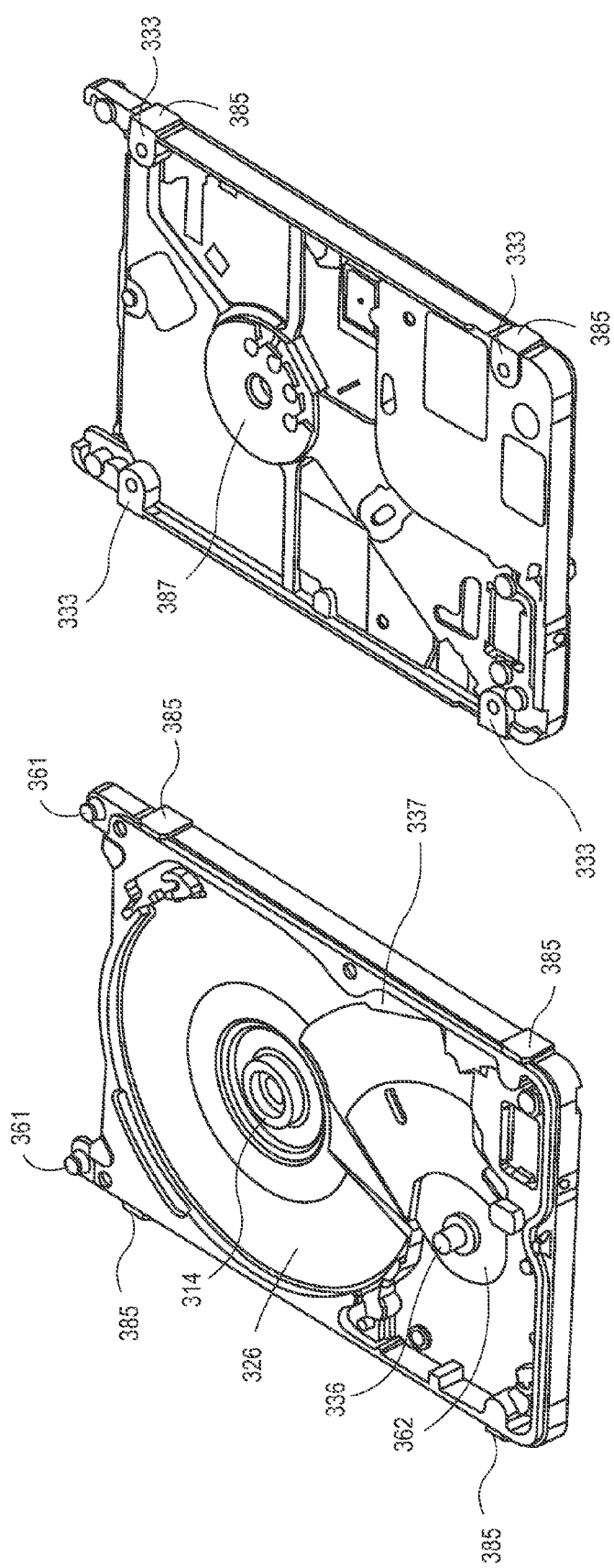

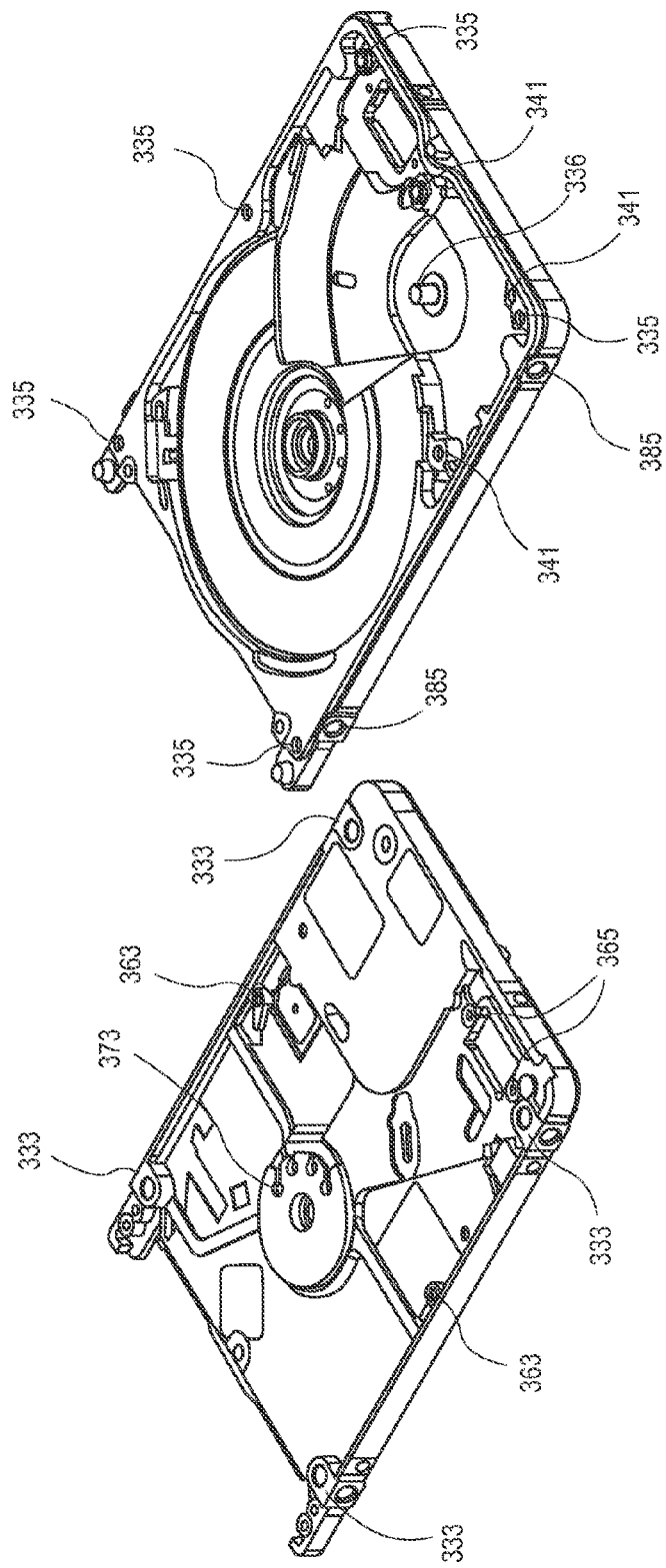

METHOD AND APPARATUS FOR PROGRESSIVELY FORGING A HARD DISK DRIVE BASE PLATE

FIELD

Embodiments of the present invention relate generally to the field of manufacturing metal parts and more specifically, a manufacturing process for forming a base plate for a hard disk drive.

BACKGROUND

The housing of a hard disk drive for use in computer systems typically includes a cover and a base plate attached with screws. A base plate supports the hard disk drive assembly (e.g., spindle, motor, and actuator).

One conventional base plate manufacturing process includes press working a sheet of metal with side frames mounted on opposing sides. In this process, a base plate is press worked to form a concave portion with a few holes for motor mounting. Two side frames are press worked from sheet metal and are fixedly mounted on the opposite sides of the base plate.

There are several disadvantages to this conventional process. For example, fixing the two side frames to the base plate is an additional assembly step that typically increases the time and cost of manufacturing. The side frames typically must be strictly controlled with respect to the mounting position and the mounting strength. Another disadvantage is that relief surfaces for elements such as the disk, the actuator, the voice coil motor, the filter, and bosses or semi-pierces are typically not part of this process. Instead, all relief surfaces are typically formed as part of a machining operation. Additionally, oil and other residue that are used during the cold working operation must be removed by washing the finished base plate.

SUMMARY

A method for forming a hard disk drive base plate with a sequence of progressive forging operations is described. An initial hard disk drive base plate cut from an extruded sheet is advanced through a plurality of stations of a transfer die assembly. A sequence of forgings is performed on the initial hard disk drive base plate to progressively form parts on a hard disk drive base plate.

A system for forming a hard disk drive base plate with a sequence of progressive forging operations is also described. A transfer die assembly is used to advance an initial hard disk drive base plate cut from an extruded sheet through multiple stations of the transfer die assembly. A plurality of stations from the multiple stations perform a sequence of forgings on the initial hard disk drive base plate to progressively form parts on a hard disk drive base plate.

BRIEF DESCRIPTION OF THE DRAWINGS

Embodiments of the present invention are illustrated by way of example, and not limitation, in the figures of the accompanying drawings in which:

FIGS. 3 and 4 illustrate one embodiment of a first stage of a method for forming a hard disk drive base plate with a sequence of progressive forging operations.

FIGS. 7-10 illustrate one embodiment of a third stage of the method for forming a hard disk drive base plate with a sequence of progressive forging operations.

FIGS. 15-17 illustrate one embodiment of a fifth stage of the method for forming a hard disk drive base plate with a sequence of progressive forging operations.

FIGS. 18-21 illustrate one embodiment of a sixth stage of the method for forming a hard disk drive base plate with a sequence of progressive forging operations.

FIGS. 26 and 27 illustrate one embodiment of an eighth stage of the method for forming a hard disk drive base plate with a sequence of progressive forging operations.

FIGS. 28 and 29 illustrate one embodiment of a ninth stage of the method for forming a hard disk drive base plate with a sequence of progressive forging operations.

DETAILED DESCRIPTION

Figure 1:
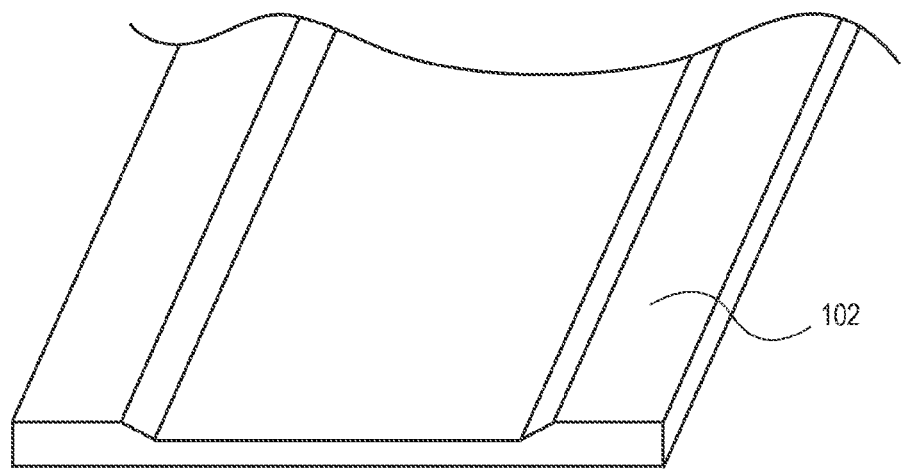
FIGS. 1 and 2 illustrate an extruded sheet.

A method using transfer die stamping to forge and form a hard disk drive ("HDD") base plate is described. For one embodiment, an initial blank base plate is advanced through a plurality of stations of a transfer die assembly. For one embodiment, parts are forged on the initial blank base plate to form a hard disk drive base plate. The forging comprises forming various parts of the hard disk drive base plate, such as a motor hub, a voice coil motor relief surface, and an actuator pivot bearing post. In the embodiments discussed below, other parts are also forged from the initial blank to form the final hard disk drive base plate form. The forging occurs over a sequence of stages, where each stage in the sequence involves forming, either partially or fully, various features of the hard disk drive base plate. The embodiments for forming a hard disk drive base plate from a sequence of forging operations are discussed herein with respect to forming a hard disk drive base plate. The forging methods discussed herein may also be used for forming other types of metal parts.

The embodiments discussed herein have advantages over conventional hard disk drive construction methods, such as die casting and assembly of a press worked base plate. A forged base is free of porosity and cavity problems associated with die casting (e.g., bubbles or air pockets in the cast metal base plate), thus having more predictability of resonance. Furthermore, a base plate forged over a series of stages, as discussed herein, results in a working hardening of the base plate, therefore improving the rigidity and tensile strength of the forged base plate over die cast and conventional press working base plates. For example, the forged hard disk drive base plate, as discussed herein, will have reduced non-homogeneous stress distortion and a more compact grain structure from the working hardening effect.

Another benefit of the forging processes, discussed herein, is that the improved rigidity and strength of the forged hard disk drive enable the formed hard disk drive to have a thinner wall thickness, thus eliminating machining cycle time to reduce wall thickness when contrasted with a casted base plate. Furthermore, reduced wall thickness decreases the overall weight of the hard disk drive base plate, while still maintaining and increasing the strength and rigidity of the base plate. For one embodiment, the utilization of 6061 aluminum in the forging process will result in a HDD base plate with better tensile strength, of about 276 megapascals (MPAs) and about a 60 Rockwell-B hardness, as compared to die casted HDD base plates, which typically have a tensile strength of about 159 MPA and a 47 Rockwell-B hardness.

For one embodiment, an extruded sheet of metal is progressively formed in a series of transfer dies over a sequence of forging stages. The press plates of the transfer dies that perform forging operations are coated in a titanium nitride ("TiN") coating to increase the hardness of the press plates, and increase the tool life of the press plates, improve the efficiency of the forging. For one embodiment, the TiN coating is periodically removed (i.e., about every 300,000 pressings) from the transfer die machines, and a new coating of TiN is applied to the forging press plates. For one embodiment, additional press working operations are also used to form a hard disk drive base plate, including trimming, piercing, stamping, coining, or other suitable processes. Coining relates to imprinting a shape of a face, an image, or a shape on a metal sheet, and may also be employed in the method of forging a hard disk drive base plate.

For one embodiment, the metal used in the sequence of forging stages for forming a hard disk drive base plate is an aluminum alloy, such as aluminum 6061, aluminum 5052, or aluminum 110, in the form of an extruded sheet 102, as illustrated in FIG. 1. For alternative embodiments, other suitable materials such as, for example, cold rolled or low carbon steel in the form of the extruded sheet of FIG. 1, may also be used. For one embodiment, the metal used to form the hard disk drive base plate may be chosen based on various factors—for example, design requirements, desired material properties, reduced contamination (i.e., silicon, copper, zinc, etc. contamination) of the raw material for the hard disk drive base plate, and reduced natural magnetism of the hard disk drive base plate. For one embodiment, the aluminum alloy in the form of the extruded sheet 102 is initially used to prepare a blank for stamping and forming of a hard disk drive base plate.

Figure 2:
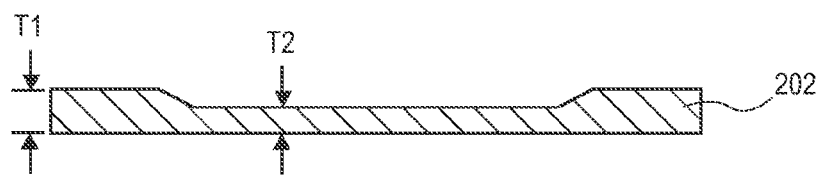

FIG. 2 illustrates a section view 202 of the extruded sheet 102. For the embodiment illustrated in FIG. 2, the thickness T1 and T2 of the extruded sheet 102 may range from about 1 mm to about 6 mm. Selection of material thickness and an extruded sheet's profile may vary depending on a particular product design.

FIGS. 3-29 illustrate one embodiment of a method for forming a hard disk drive base plate with a sequence of progressive forging operations. A progressive die assembly utilized in the method illustrated by FIGS. 3-29 may include multiple stations. The hard disk drive base plate is advanced from station to station to complete each of the plurality of progressive forgings. Each station may perform forgings, as well as other machining operations, from more than one stage. The specific forging operations discussed below form, either partially or fully, parts on the hard disk drive base plate as it is advanced through the sequence of stages. Furthermore, the sequence of progressive forgings form, either partially or fully, specific parts on the hard disk drive base plate at specific stages in order to manage the movement of material caused by the forging operations, and to ensure a uniform thickness of the resulting fully formed hard disk drive base plate. Furthermore, the order of forging operations and formation of different parts ensures that the intricate details of the hard disk drive base plate are properly formed.

In stage 1 of the hard disk drive base plate forming process, the extruded sheet material (i.e., 102), is fed into a die (not shown) to trim a blank 310, as illustrated in FIG. 3, with pilot holes 312 to guide the blank 310 for a next stamping process. FIG. 3 illustrates a top view of the blank 310 and FIG. 4 illustrates a cross-sectional view 311 of the blank 310.

Figure 5:
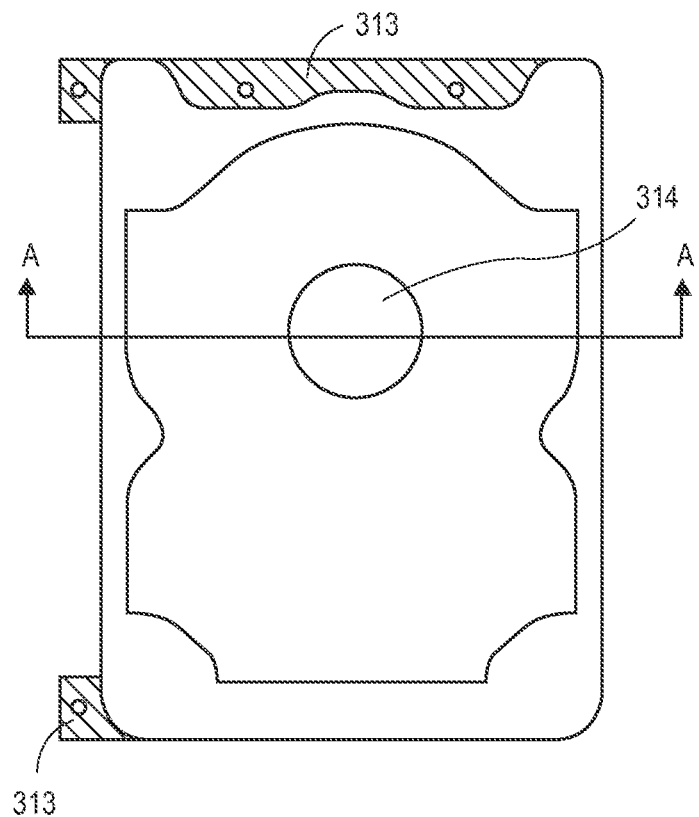
FIGS. 5 and 6 illustrate one embodiment of a second stage of the method for forming a hard disk drive base plate with a sequence of progressive forging operations.
Figure 6:
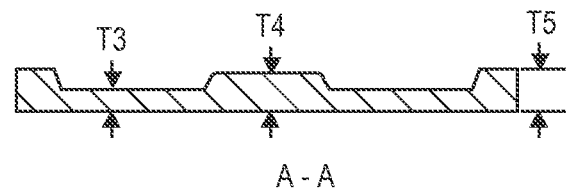

FIG. 5 illustrates stage 2 of the method for forming a hard disk drive base plate with a sequence of progressive forging operations after coining and trimming processes are applied to blank 310. For one embodiment, a forging is performed on blank 310 at stage 2 that results in the material thickness in the middle of blank 310 to be moved to the sides and a motor hub 314 portion of blank 310. FIG. 6 illustrates a cross sectional view of the motor hub 314 portion of blank 310 taken along line A-A. As illustrated in FIG. 6, middle portion material thickness T3 may be about, or less than, half of the material thickness of the motor hub area thickness T4 and surrounding areas thickness T5 after the coining process. After the coining process, overflow material 313 is trimmed off to become an "initial blank" base plate.

For one embodiment, internal stresses of the formed had disk drive base plate may be removed from the formed initial blank base plate by annealing. For one embodiment, the hard disk drive base plate is annealed after successive transfer die assembly pressings. For another embodiment, the hard disk drive base plate is annealed before advancing the hard disk drive base plate the forging die assembly stages, as discussed herein. The progressive stages of forging are performed at room temperature, and annealing may be used between one or more stage of the sequential and progressive process. For example, a base plate being forged by the sequential and progressive forging stages may be annealed after every other stage, every three stages, between select stages, etc. For one embodiment, annealing is performed by heating the base plate being forged to approximately 280 degrees Celsius, and then allowing the base plate to cool. Different annealing temperatures may be used between different stages. For one embodiment, the formed initial blank base plate may alternatively, or in addition, be heated up to soften it for hot forging when used in a transfer die assembly or before advancing in each forging stage, as discussed herein, to form a hard disk drive base plate.

FIGS. 7-10 illustrate stage 3 of the method for forming a hard disk drive base plate with a sequence of progressive forging operations. A die press forges the initial blank to partially form a motor hub 314, a voice coil relief surface 316, an actuator pivot bearing post 336, a disk relief surface 326, an actuator relief surface 328, an actuator sitting surface 362, a motor sitting surface 360, and a ramp pad surface 337. FIG. 7 illustrates a front side view, and FIG. 9 illustrates a back side view, of the forged initial blank. On the front side, the forged initial blank further includes a top cover mounting boss 335 on the front side of the forged initial blank. On the back side, the forged initial blank will have three partially formed reinforcement ribs 331 and back mounting bosses 333. FIG. 8 illustrates a cross sectional view of the motor hub 314 portion of the forged initial blank taken along line B-B. FIG. 10 illustrates a cross sectional view of the actuator pivot bearing post 336 portion of forged initial blank taken along line C-C.

Figure 11:
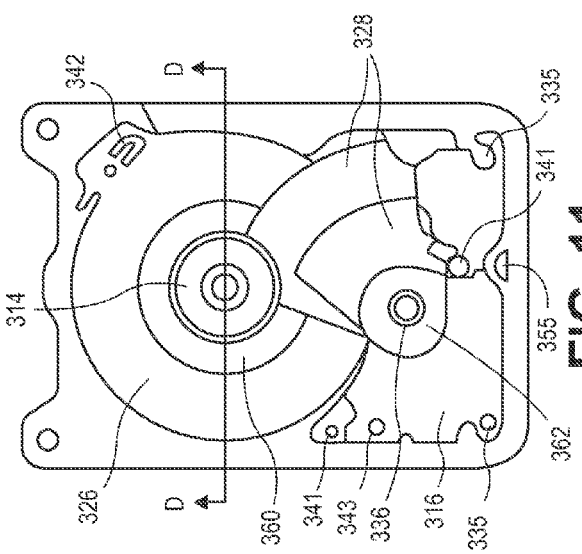
FIGS. 11-14 illustrate one embodiment of a fourth stage of the method for forming a hard disk drive base plate with a sequence of progressive forging operations.
Figure 12:
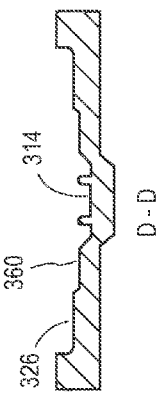
Figure 13:
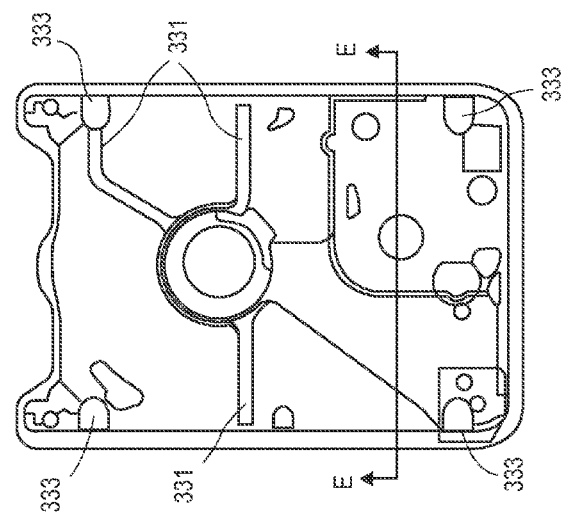
Figure 14:
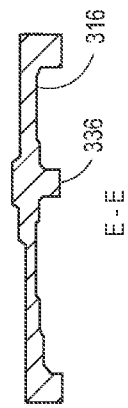

Stage 4 of the sequence of progressive forging operations, as illustrated in FIGS. 11-14, performs a forging that fully forms the motor hub 314, voice coil relief surface 316, actuator pivot bearing post 336, a disk relief surface 326, actuator relief surface 328, actuator sitting surface 362, and motor sitting surface 360 on the front side of the initial blank, as illustrated in FIG. 11. FIG. 12 illustrates a cross sectional view of the motor hub 314 portion of the forged initial blank taken along line D-D. On the back side of the initial blank, as illustrated in FIG. 13, three reinforcement ribs 331 and back mounting bosses 333 are also fully formed in stage 3. FIG. 14 illustrates a cross sectional view of the actuator pivot bearing post 336 portion of the forged initial blank taken along line E-E. The forging performed at stage 4 also partially forms disk filter holder 342, latch boss 343, two voice coil motor ("VCM") locating posts 341, one top cover mounting boss 335, and a top cover locating boss 355 on the front side, as illustrated in FIG. 11.

In stage 5 of the sequence of progressive forging operations, disk filter holder 342, flex bracket surface 353, four side walls 347, latch boss 343, crash stop post 345, one additional VCM locating post on the bottom left corner 341 of the front side, ramp pad surface 337, two additional top cover mounting bosses 335 on the top of the front side, and two top corner outer locating bosses 361 are partially formed on the front side of the disk drive base plate, as illustrated in FIG. 15. Furthermore, on the back side of disk drive base plate, as illustrated in FIG. 17, two printed circuit board assembly ("PCBA") mounting bosses 363, two flex bracket mounting bosses 365, which may also act as PCBA mount bosses, and four side walls 367 are partially formed in stage 5. Overflow material 351 is generated as a result of metal pressing and moving during the sequence of progressive forging operations around the sides of the formed walls. FIG. 16 illustrates a cross sectional view of the motor hub 314 portion of the hard disk drive base plate taken along line F-F.

Stage 6 of the sequence of progressive forging operations fully forms disk filter holder 342, flex bracket surface 343, side walls 347, latch boss 343, crash stop post 345, VCM locating posts 341, ramp pad surface 337, top cover mounting bosses 335, and top outer locating bosses 361 on the front side of the hard disk drive base plate, as illustrated in FIG. 18. FIG. 19 illustrates a cross sectional view of the latch boss 343, relief surfaces 316, 362, 328 and 337, side walls 347 and 367, and the overflow material 351 portions of the forged initial blank taken along line G-G. On the back side of the disk drive base plate, as illustrated in FIG. 20, stage 6 fully forms PCBA mounting bosses 363, flex bracket mounting bosses 365, which also act as PCBA mount bosses, PCBA recess surface 371, motor hub flex soldering holes 373, and side walls 367 around the hard disk drive base plate. FIG. 21 is a cross sectional view of the top left side of the hard disk drive base plate in FIG. 20, and illustrates the back mounting boss 333 and motor hub flex soldering holes 373 portions of the hard disk drive base plate taken along line G-G.

Figure 22:
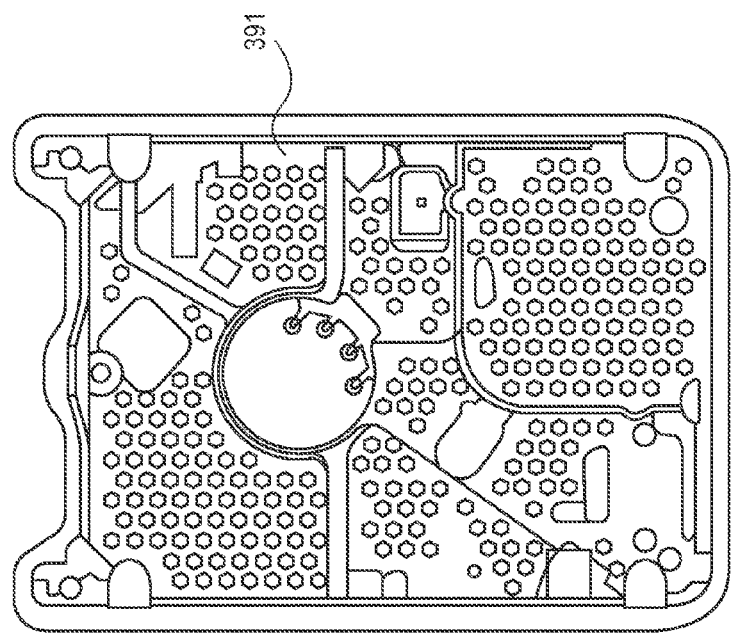
FIGS. 22 and 23 illustrate one embodiment of adding a honeycomb cell feature during a fifth stage of the method for forming a hard disk drive base plate with a sequence of progressive forging operations.
Figure 23:
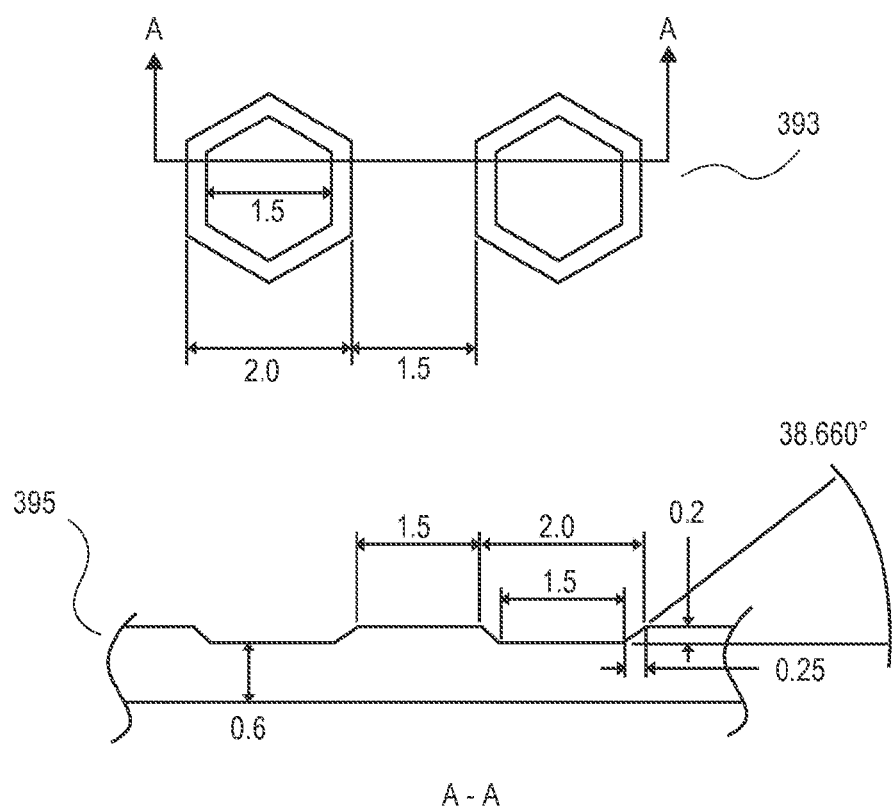

Stage 6 of the sequence of progressive forging operations may further include forging a honeycomb cell feature into the back side of the hard disk drive base plate, as illustrated in FIG. 22. The honeycomb cell feature 391 may be added/formed on the back side of the base plate (i.e., FIG. 20) with a forging operation during stage 6. The addition of the honeycomb cell feature 391 increases the formed hard disk drive base plate's rigidity and stiffness. The particular dimensions, 393 and 395, such as spacing, depth, and volume of cells in one embodiment of a honeycomb cell feature are illustrated in FIG. 23. Although a hexagonal cell shape is illustrated in FIGS. 22 and 23, other dimensions and shapes, such as circles, octagons, etc. may be utilized as a base plate cell feature to increase rigidity. Forging of the honeycomb cell feature into the back of the hard disk drive base plate enables the cell feature to be added to the base plate with greatly increased precision and accuracy, without the increased cost, quality control issues, and commercial impracticability of creating such a feature using die cast methods.

Figure 24:
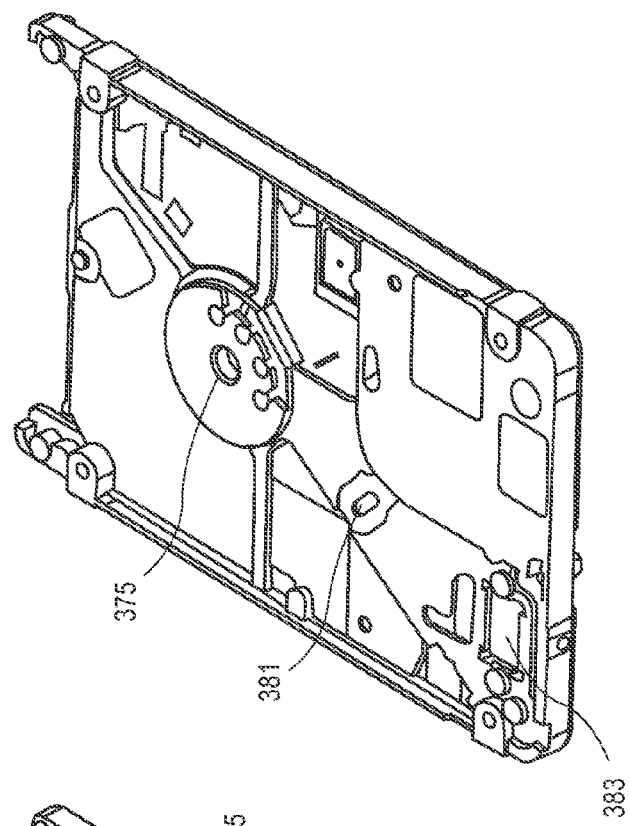
FIGS. 24 and 25 illustrate one embodiment of a seventh stage of the method for forming a hard disk drive base plate with a sequence of progressive forging operations.
Figure 25:
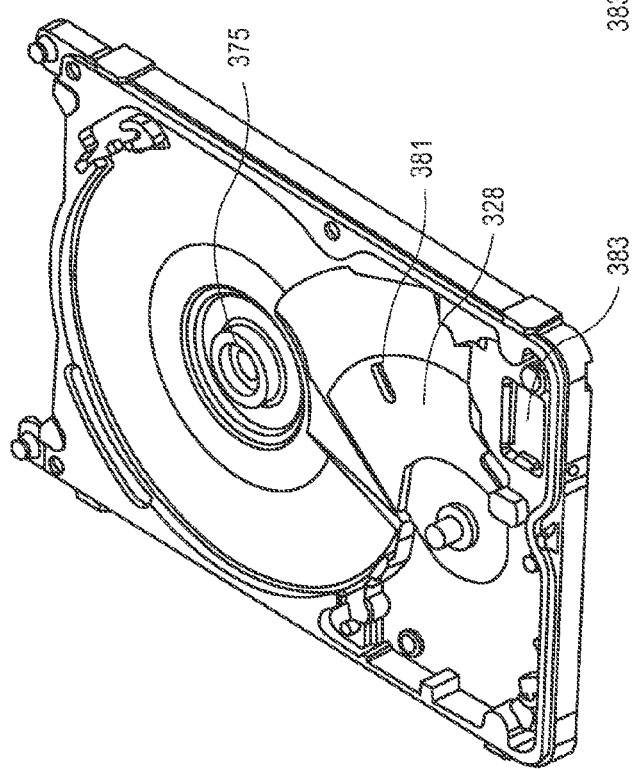

FIGS. 24 and 25 illustrate stage 7 of the sequence of progressive forging operations, in which the overflow material 351, formed during the forgings in the previous stages, is trimmed to achieve the desired base plate shape. FIG. 24 illustrates a front side view of the base plate, and FIG. 25 illustrates a back side view of the base plate, after the overflow material 351 is trimmed. For one embodiment, the motor hub hole 375, the oblong hole on actuator relief surface 381, and the flex bracket rectangle hole 383 may be pierced, rather than forged, during stage 7.

In stage 8 of the method for forming a hard disk drive base plate, as illustrated in FIGS. 26, the front side of the base plate is machined to refine datums such as the mounting pads 385, motor hub 314, actuator sitting area 362, actuator pivot bearing post 336, disk relief surface 326, ramp pad surface 337, and the two top corner outer locating bosses 361. As illustrated in FIG. 27, the back side of the base plate is also machined to refine datums, such as the back mounting bosses 333 and motor hub 387.

In stage 9 of the method for forming a hard disk drive base plate, as illustrated in FIGS. 28 and 29, holes are drilled and thread is formed or tapped on the holes, such as the mounting pads 385 on the front and back side of the base plate. Furthermore, on the front side of the base plate, as illustrated in FIG. 29, the actuator pivot bearing post 336, VCM locating posts 341, and top cover mounting bosses 335 are formed. As illustrated in FIG. 28, the motor hub flex soldering holes 373, back mounting bosses 333, flex bracket mounting boss 365, and PCBA mounting bosses 363 are formed on the back side of the base plate.

During the final stage, the machined base plate may undergo a surface treatment to clean any residual dirt and/or oil deposited on the base plate during the forming process discussed herein. For one embodiment, a surface finishing or coating, such as Electroless Nickel Plating, may be applied after the surface treatment and before proceeding to a next assembly process involving the formed based plate, such as mounting of a motor assembly, actuator arm, and VCM assembly, on the base plate.

Figure 30:
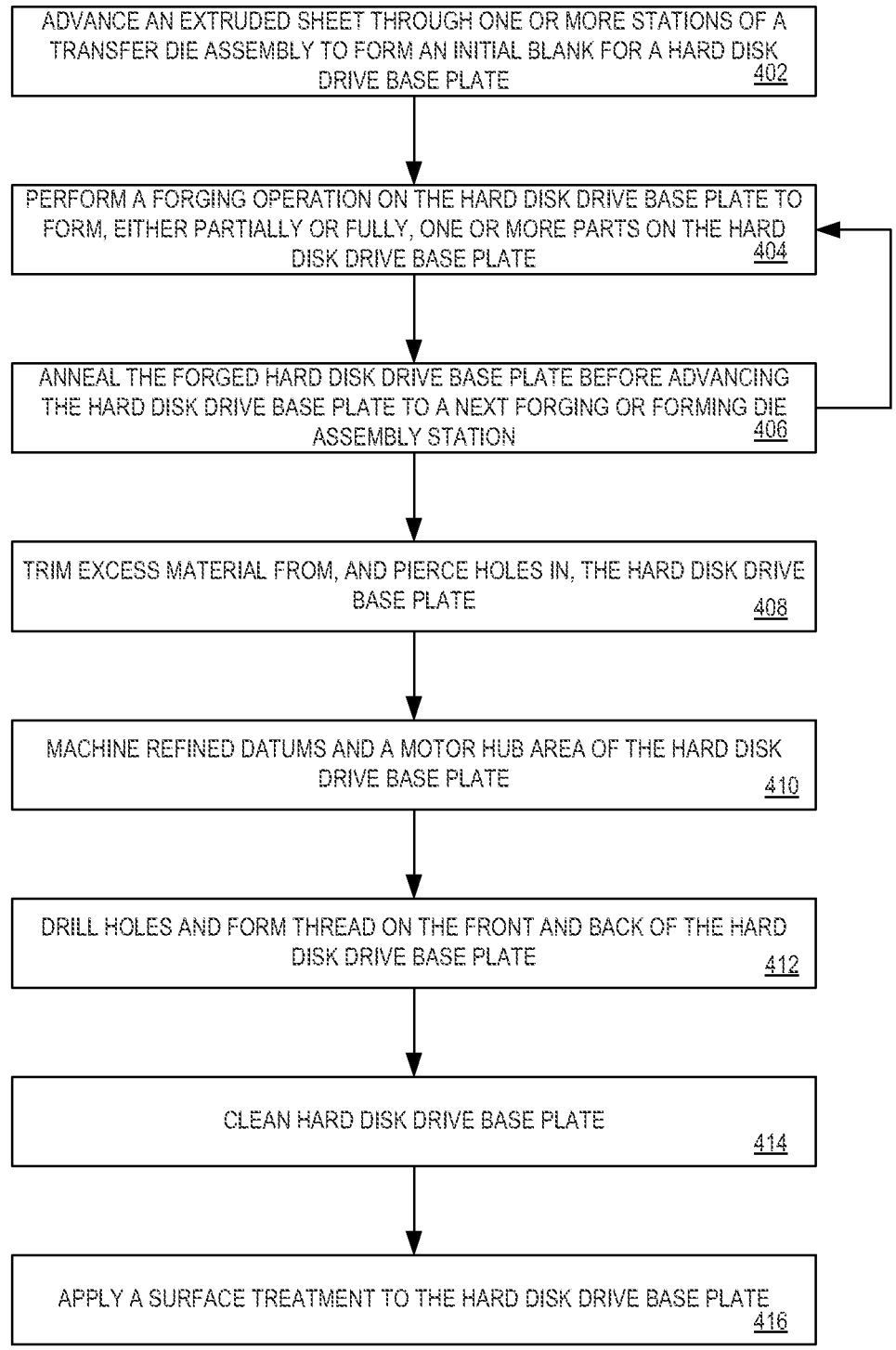
FIG. 30 illustrates a block diagram of a method of forming a hard disk drive base plate with a sequence of progressive forging operations.

FIG. 30 illustrates a block diagram of a method of forming a hard disk drive base plate with a sequence of progressive forging operations. The progressive die assembly used in the method illustrated by FIG. 30 may include multiple stations with a hard disk drive base plate advanced from station to station. The method includes performing a sequence of progressive forgings using the transfer die assembly.

The method begins by advancing an extruded sheet through one or more stations of a transfer die assembly to form an initial blank for the hard disk drive base plate (block 402). A forging operation is then performed on the hard disk drive base plate to form, either partially or fully, one or more parts on the hard disk drive base plate (block 404).

After a forging operation, the base plate may be annealed before advancing the hard disk drive base plate to a next forging or forming die assembly station in the sequence of progressive hard disk drive forming stages (block 406). The hard disk drive base plate may alternatively be heated up to soften the base plate, if necessary, before advancing the hard disk drive base plate to a next forging stations in the sequence of progressive forgings. For one embodiment, the progressive stages of forging are performed at room temperature, and the annealing in block 404 may be utilized between one or more stage of the sequential and progressive process. For example, a base plate being forged by the sequential and progressive forging stages may be annealed after every other stage, after every three stages, or between select stages.

The process then returns to block 404 to perform another forging operation, followed by an annealing, on the hard disk drive base plate. As discussed herein, the hard disk drive base plate is formed with a sequence of progressive forging operations that partially or fully form parts on the hard disk drive base plate. Because the parts on the hard disk drive base plate may be intricate and detailed, the sequence of forgings through multiple stages, as discussed above, is used. Thus, blocks 404 and 406 repeat to perform the sequence of forging operations as discussed above to ensure the proper formation of parts on the hard disk drive. By advancing the base plate through forging and annealing stages, as discussed above, in blocks 404 and 406, a motor hub, voice coil motor relief surface, actuator pivot bearing post, disk relief surface, actuator relief surface, actuator sitting surface, motor sitting surface on the front side of base plate and on the back side, reinforcement ribs and back mounting bosses are formed on the hard disk drive base plate. By continuing to advance the base plate through the forging and annealing stages, as discussed above, in blocks 404 and 406 a disk filter holder, flex bracket surface, side walls, latch boss, crash stop post, VCM locating posts, ramp pad surface, top cover mounting bosses, top outer mounting bosses on the front and back side of the hard disk drive base plate, PCBA mounting bosses, flex bracket mounting bosses, PCBA recess surface, motor hub flex soldering holes and side walls are also formed. The forging and annealing of blocks 404 and 406 may also be used to add a honeycomb cell feature to a backside, or front side, of the hard disk drive base plate.

Excess and overflow material, if any, is trimmed from the hard disk drive base plate, and a motor hub hole, oblong hole on the actuator relief surface, and flex bracket rectangle are pierced into the hard disk drive base plate (block 408). The progressive forgings, performed earlier in the forging and forming process, cause the movement of metal in the hard disk drive base plate to the outer edges of the base plate. Refined datums and the motor hub area are machines (block 410). Holes are then drilled and thread is formed on the front and back of the hard disk drive base plate (block 412). The base plate is cleaned (block 414) to remove any buildup of oil, grease, and particles that have accumulated on the hard disk drive base plate during the forming process.

A surface treatment is then applied to the hard disk drive base plate (block 416). A coating or finish is applied to the hard disk drive base plate to prepare the base plate for a next assembly process (not illustrated), such as the mounting of a motor assembly, actuator arm, VCM assembly, etc. For one embodiment, the surface treatment is includes the application of an Electroless Nickel Plating to the hard disk drive base plate.

In the foregoing specification, the invention has been described in reference to specific exemplary embodiments thereof. It will, however, be evident that various modifications and changes may be made thereto without departing from the described spirit and scope of the invention. The specification and drawings are, accordingly, to be regarded as illustrative rather than a restrictive sense.

What is claimed is:

1. A method for forging a hard disk drive base plate, comprising:
  advancing an initial hard disk drive base plate cut from an extruded sheet through a plurality of stations of a transfer die assembly; and
  performing a sequence of progressive forgings on the initial hard disk drive base plate to progressively form parts for a hard disk drive base plate comprising:
    performing a first forging, in the sequence of progressive forgings, on the initial hard disk drive base plate to partially form the hard disk drive base plate by moving a material thickness in a middle of the initial hard disk drive base plate to sides and a motor hub portion of the initial hard disk drive base plate, wherein a material thickness of the sides and motor hub portion of the initial hard disk drive base plate is at least twice a material thickness of the middle of the initial hard disk drive base plate after the moving,
    performing a second forging, on the partially formed hard disk drive base plate from the first forging, that partially forms one or more parts comprising at least a ramp pad surface on a front side of the partially formed hard disk drive base plate and at least one or more reinforcement ribs on a back side of the partially formed hard disk drive base plate, and
    performing at least a third forging, after the second forging in the sequence of progressive forgings, that fully forms the one or more parts on the front and back sides of the partially formed hard disk drive base plate.

2. The method of claim 1, wherein performing the sequence of progressive forgings on the initial hard disk drive base plate further comprises:
  forming a motor hub, a voice coil motor relief surface, an actuator pivot bearing post, a disk relief surface, an actuator relief surface, an actuator sitting surface, a motor sitting surface on a front side and on a back side of the hard disk drive base plate, one or more reinforcement ribs, and one or more mounting bosses on the back side of the hard disk drive base plate.

3. The method of claim 2, wherein performing the sequence of progressive forgings on the initial hard disk drive base plate further comprises:
  forming a disk filter holder, a flex bracket surface, one or more side walls, a latch boss, a crash stop post, a voice coil motor (VCM) locating posts, a ramp pad surface, one or more top cover mounting bosses, one or more top outer mounting bosses on the front side and the back side of the hard disk drive base plate, one or more printed circuit board assembly (PCBA) mounting bosses, one or more flex bracket mounting bosses, a PCBA recess surface, and one or more motor hub flex soldering holes.

4. The method of claim 1, wherein performing the sequence of progressive forgings on the initial hard disk drive base plate further comprises:
  forming a honeycomb cell feature of the back side of the hard disk drive base plate.

5. The method of claim 1, wherein performing the sequence of progressive forgings on the initial hard disk drive base plate further comprises:

annealing the hard disk drive base plate after one or more stages in the sequence of progressive forgings.

6. The method of claim 1, further comprising:
trimming excess and overflow material, if any, from the hard disk drive base plate;
piercing a motor hub hole, an oblong hole on an actuator relief surface, and a flex bracket rectangle into the hard disk drive base plate;
machining datums and a motor hub;
drilling holes on a front and a back of the hard disk drive base plate; and
forming thread in the drilled holes.

7. The method of claim 1, further comprising:
cleaning the hard disk drive base plate; and
applying a surface treatment to the cleaned hard disk drive base plate.

8. The method of claim 7, wherein the applied surface treatment is an Electroless Nickel plating.

9. The method of claim 1, wherein the sequence of progressive forgings are performed at room temperature.

10. The method of claim 1, wherein press plates of stations of the transfer die assembly that perform the forging operations are coated with titanium nitride.

11. The method of claim 1, wherein the hard disk drive base plate is formed from an aluminum alloy.

12. The method of claim 11, wherein the aluminum alloy is aluminum 6061.

13. The method of claim 1, further comprising:
performing the second forging after the first forging to partially form at least one or more back mounting bosses on the back side of the partially formed hard disk drive base plate.

14. The method of claim 1, wherein the sequence of progressive forgings form, either partially or fully, different subsets of parts on the hard disk drive base plate at specific forging stages to manage a movement of material over the sequence of progressive forgings caused by different forging operations that progressively form the different subsets of parts in the sequence of progressive forgings to obtain a fully formed hard disk drive base plate with a uniform thickness.

15. A system for forging a hard disk drive base plate, comprising:
a transfer die assembly to advance an initial hard disk drive base plate cut from an extruded sheet through multiple stations of the transfer die assembly;
a plurality of stations from the multiple stations to perform a sequence of progressive forgings on the initial hard disk drive base plate to progressively form parts on a hard disk drive base plate, the plurality of stations to:
perform a first forging, in the sequence of progressive forgings, on the initial hard disk drive base plate to partially form the hard disk drive base plate by moving a material thickness in a middle of the initial hard disk drive base plate to sides and a motor hub portion of the initial hard disk drive base plate, wherein a material thickness of the sides and motor hub portion of the initial hard disk drive base plate is at least twice a material thickness of the middle of the initial hard disk drive base plate after the moving, perform a second forging, on the partially formed hard disk drive base plate from the first forging, that partially forms one or more parts comprising at least a ramp pad surface on a front side of the partially formed hard disk drive base plate and at least one or more reinforcement ribs on a back side of the partially formed hard disk drive base plate, and perform at least a third forging, after the second forging in the sequence of progressive forgings, that fully forms the one or more parts on the front and back sides of the partially formed hard disk drive base plate.

16. The system of claim 15, wherein the sequence of progressive forgings performed on the initial hard disk drive base plate by plurality of stations form a motor hub, a voice coil motor relief surface, an actuator pivot bearing post, a disk relief surface, an actuator relief surface, an actuator sitting surface, a motor sitting surface on a front side and on a back side of the hard disk drive base plate, one or more reinforcement ribs, and one or more mounting bosses on the back side of the hard disk drive base plate.

17. The system of claim 16, wherein the sequence of progressive forgings performed on the initial hard disk drive base plate by plurality of stations form a disk filter holder, a flex bracket surface, one or more side walls, a latch boss, a crash stop post, a voice coil motor (VCM) locating posts, a ramp pad surface, one or more top cover mounting bosses, one or more top outer mounting bosses on the front side and the back side of the hard disk drive base plate, one or more printed circuit board assembly (PCBA) mounting bosses, one or more flex bracket mounting bosses, a PCBA recess surface, and one or more motor hub flex soldering holes.

18. The system of claim 15, wherein the hard disk drive base plate is annealed after one or more stages in the sequence of progressive forgings.

19. The system of claim 15, wherein press plates of stations of the transfer die assembly that perform the forging operations are coated with titanium nitride.

20. The system of claim 15, wherein the hard disk drive base plate is formed from an aluminum alloy.

21. The system of claim 20, wherein the aluminum alloy is aluminum 6061.

* * * * *